(12) United States Patent  
Ku et al.

(10) Patent No.: US 7,332,840 B2
(45) Date of Patent: Feb. 19, 2008

(54) FAN MOTOR WITH IC RETENTION MEANS

(75) Inventors: Chin-Long Ku, Tu-Cheng (TW); Chin-Wen Yeh, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 390 days.

(21) Appl. No.: 11/019,913

(22) Filed: Dec. 21, 2004

(65) Prior Publication Data

US 2005/0168083 A1 Aug. 4, 2005

(30) Foreign Application Priority Data

Feb. 2, 2004 (CN) .................... 2004 2 0011528

(51) Int. Cl.
*H02K 11/00* (2006.01)
*H02K 1/00* (2006.01)
(52) U.S. Cl. ............... 310/68 R; 310/194; 310/DIG. 3
(58) Field of Classification Search ............. 310/68 R, 310/156.05, DIG. 3, 214, 68 B
See application file for complete search history.

(56) References Cited

U.S. PATENT DOCUMENTS 3,644,765 A * 2/1972 Janson .................... 310/68 R
4,547,714 A * 10/1985 Muller .................... 318/254
5,014,005 A * 5/1991 Murata et al. ........... 324/207.2
5,126,663 A * 6/1992 Shinjo .................... 324/207.2
5,705,873 A * 1/1998 Sato ....................... 310/193
6,025,665 A * 2/2000 Poag et al. ............... 310/89
6,191,506 B1 * 2/2001 Wright .................... 29/598
6,707,223 B1 3/2004 Huang
6,856,054 B2 * 2/2005 Shukuri et al. ........... 310/68 B
2001/0048254 A1* 12/2001 Engel et al. .............. 310/68 B
2003/0057781 A1* 3/2003 Shukuri et al. ........... 310/68 B
2005/0029882 A1* 2/2005 Liu et al. ................. 310/91

FOREIGN PATENT DOCUMENTS

JP          61121760 A  *  6/1986
JP          11275841 A  * 10/1999

* cited by examiner

*Primary Examiner*—Burton Mullins
*Assistant Examiner*—Erik Preston
(74) *Attorney, Agent, or Firm*—Morris Manning & Martin LLP; Tim Tingkang Xia, Esq.

(57) ABSTRACT

A fan motor includes a printed circuit board (200), an IC (100) and an insulating frame (50) mounted on the printed circuit board. The insulating frame includes an annular main body (44) with a number of arms (11) extending radially from an outer-periphery thereof, and a retaining member (14) formed thereon corresponding to the IC. The retaining member includes a pressing portion (12) pressing the IC to prevent slant thereof.

13 Claims, 7 Drawing Sheets

FAN MOTOR WITH IC RETENTION MEANS

TECHNICAL FIELD

The present invention relates to motors, and particularly relates to a motor for use in a cooling fan.

BACKGROUND

A conventional brushless direct current motor (hereinafter referred to as fan motor) comprises a stator and a rotor being rotatable with respect to the stator. The stator has windings to establish alternating magnetic field when an electric current having opposite directions alternatingly flows through the windings. The rotor has a permanent magnet to establish a permanent magnetic field. The magnetic field of the stator interacts with the magnetic field of the rotor to drive the rotor to rotate.

During operation, the electric current flowing through the windings is required to be regularly shifted in directions. Conventionally, such a shift is accomplished by use of an IC (Integrated Circuit) such as a Hall element that can sense position of the rotor. Once the IC senses a predetermined position of the rotor, the IC sends a signal to a control circuit to change the flow direction of the electric current.

FIG. 7 shows a conventional motor. The motor comprises a printed circuit board 30, a stator coils assembly (not labeled), a rotor (not shown) pivotably surrounding the stator coils assembly, an IC 10 and an insulating frame 40 mounted on the printed circuit board 30. A plurality of holes (not labeled) is defined in the printed circuit board 30. A plurality of pins 101 extends from the bottom end of the IC 10 into the holes of the printed circuit board 30 respectively. Since the IC 10 is supported on the printed circuit board 30 only by the pins 101, it is possible for the IC 10 to become slanted during transportation thereof or when the fan motor is subject to vibrations or shocks. If the slant of the IC occurs, the IC 10 can no longer properly sense the position of the rotor. As a result, the directions of the electric current flowing through the windings can not be regularly shifted, thereby causing malfunction of the fan motor.

SUMMARY OF THE INVENTION

The present invention is directed to a fan motor which can prevent slant of the IC mounted on the printed circuit board.

A fan motor according to the present invention comprises a printed circuit board, an IC and an insulating frame mounted on the printed circuit board. The insulating frame comprises an annular main body with a plurality of arms extending radially from an outer-periphery thereof, and a retaining member formed thereon corresponding to the IC. The retaining member comprises a pressing portion pressing the IC to prevent slant thereof.

Other objects, advantages and novel features of the present invention will be drawn from the following detailed description of the preferred embodiments of the present invention with attached drawings, in which:

DETAILED DESCRIPTION OF PREFERRED EMBODIMENTS

Figure 1:
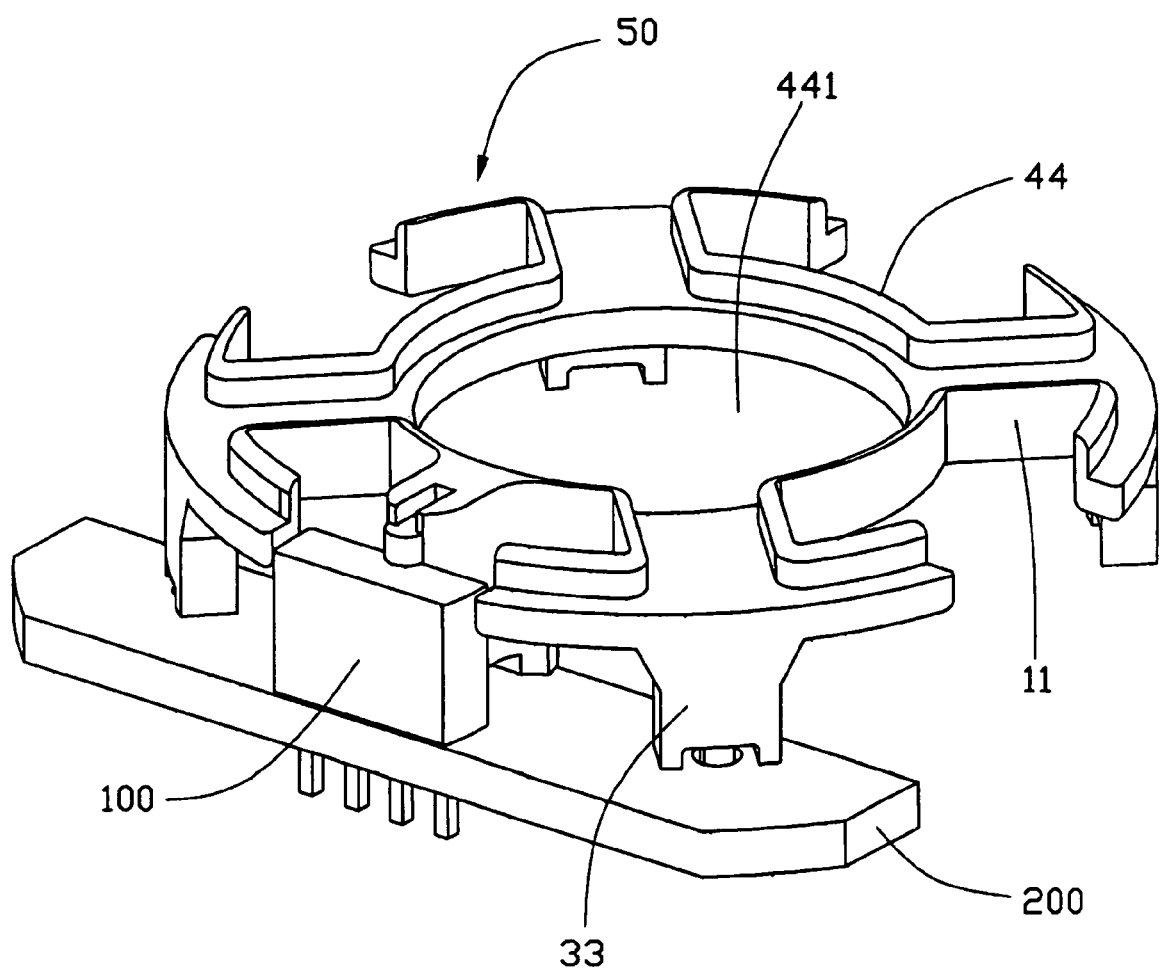
FIG. 1 is an assembled, isometric view of a fan motor in accordance with a preferred embodiment of the present invention.
Figure 2:
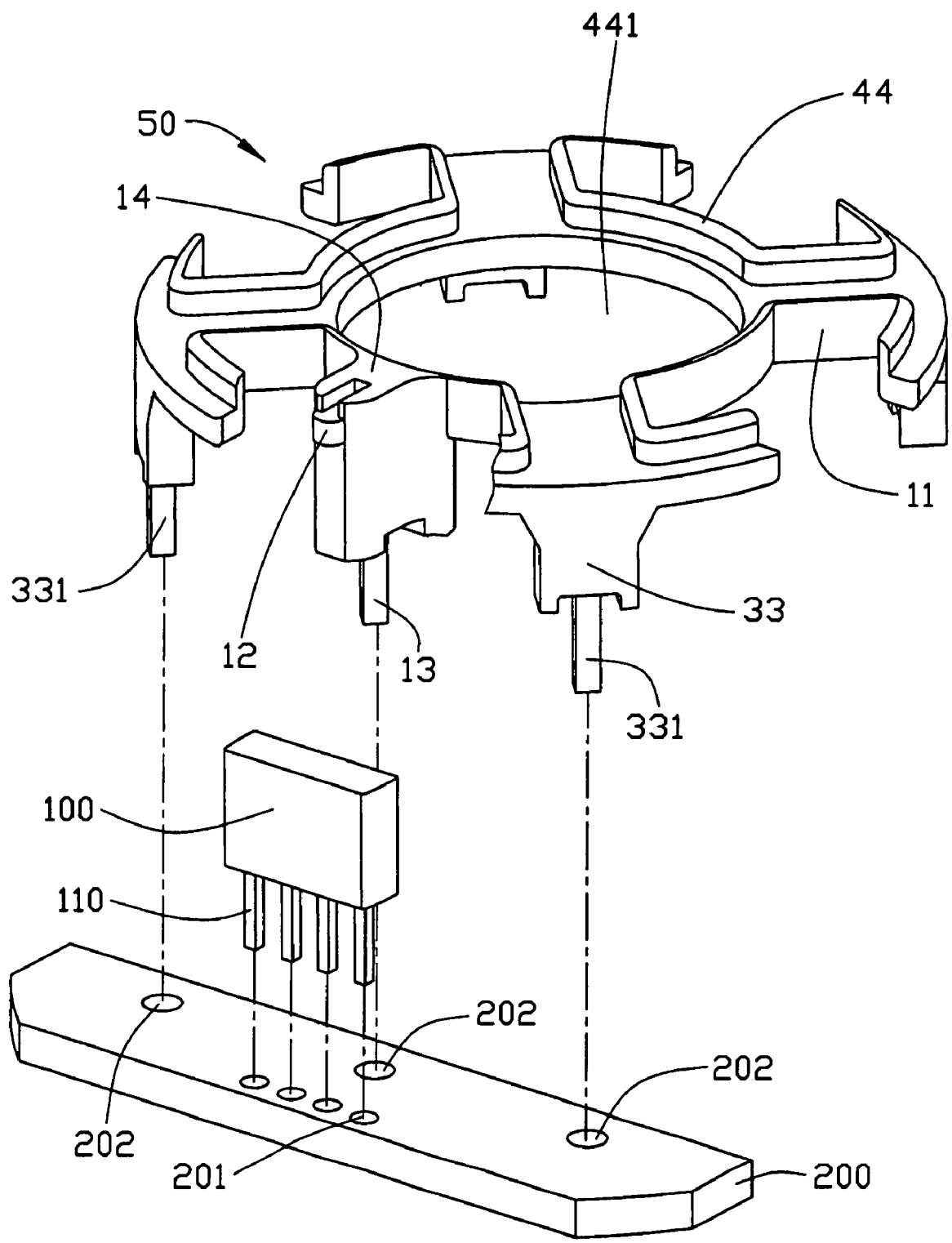
FIG. 2 is an exploded, isometric view of the fan motor in FIG. 1.
Figure 3:
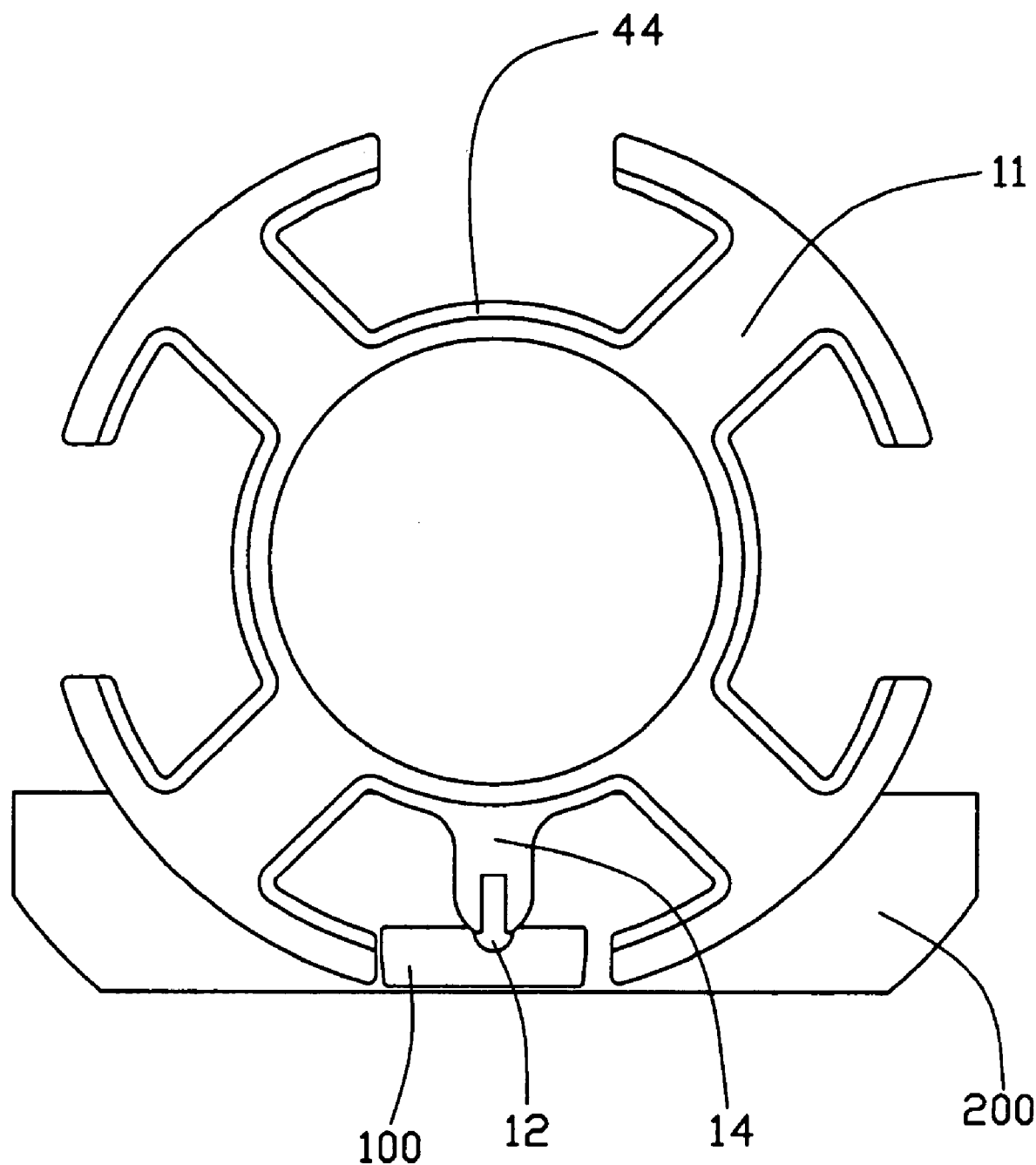
FIG. 3 is a top plan view of the fan motor in FIG. 1.

Referring to FIGS. 1 through 3, a fan motor according to a preferred embodiment of the present invention comprises a printed circuit board 200, an electronic component like an IC 100 and an insulating frame 50 mounted on the printed circuit board 200.

A plurality of holes 201 and 202 are defined in the printed circuit board 200. The IC 100 is mounted to the printed circuit board 200 by a plurality of terminals 110 extending therefrom to engage into the holes 201 of the printed circuit board 200 respectively.

The insulating frame 50 comprises an annular main body 44 and a plurality of arms 11 extending radially from the outer-periphery of the main body 44. An opening 441 is defined in the main body 44. A plurality of flanges 33 extends downwardly from the outer ends of the arms 11 respectively. A first mounting pin 331 extends from a bottom end of each of two neighboring flanges 33. The first mounting pins 331 are secured in the holes 202 of the printed circuit board 200, thereby mounting the insulating frame 50 on the printed circuit board 200. The first mounting pins 331 are made of electrically conductive material such as metal. The first mounting pins 331 may be integrated with the flanges 33 by molding process. Alternatively, the first mounting pins 331 and the flanges 33 may be separately manufactured and then assembled together.

A retaining member 14 is formed on the main body 44 between the neighboring flanges 33 that form the first mounting pins 331. The retaining member 14 forms a flat front surface to abut a side surface of the IC. A pressing portion 12 is formed on a top front side of the retaining member 14 to engage a top surface of the IC 100, thereby preventing slant of the IC 100. A second mounting pin 13 extends from the bottom end of the retaining member 14 into the holes 202 of the printed circuit board 200 to mount the retaining member 14 on the printed circuit board 200, thereby further securing the insulating frame 50 on the printed circuit board 200. The second mounting pin 13 is made of electrically conductive material such as metal. The second mounting pin 13 may be integrated with the retaining member 14 by molding process. Alternatively, the second mounting pin 13 and the retaining member 14 may be separately manufactured and then assembled together.

Figure 4:
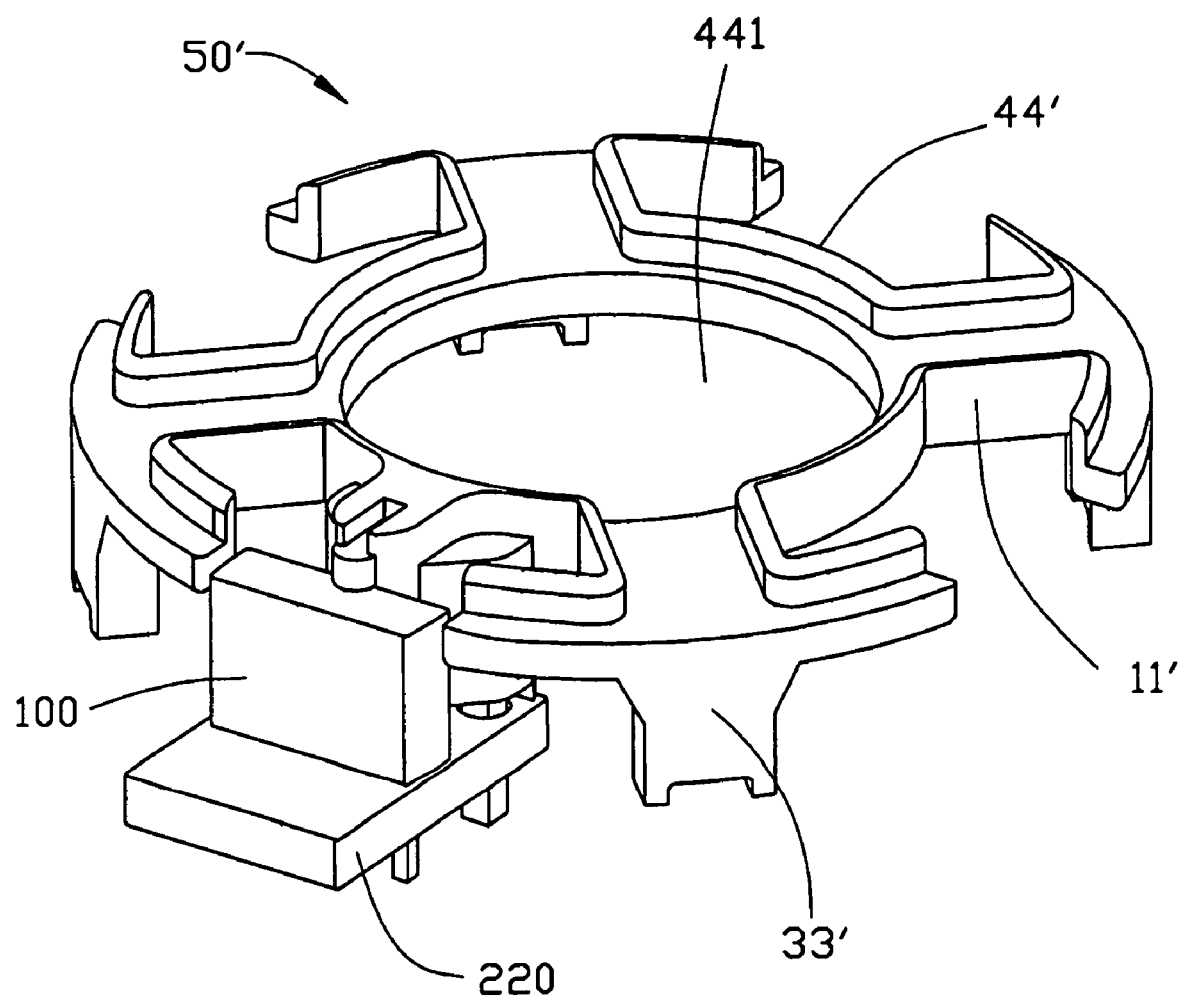
FIG. 4 is an assembled, isometric view of an alternative embodiment of the present invention.
Figure 5:
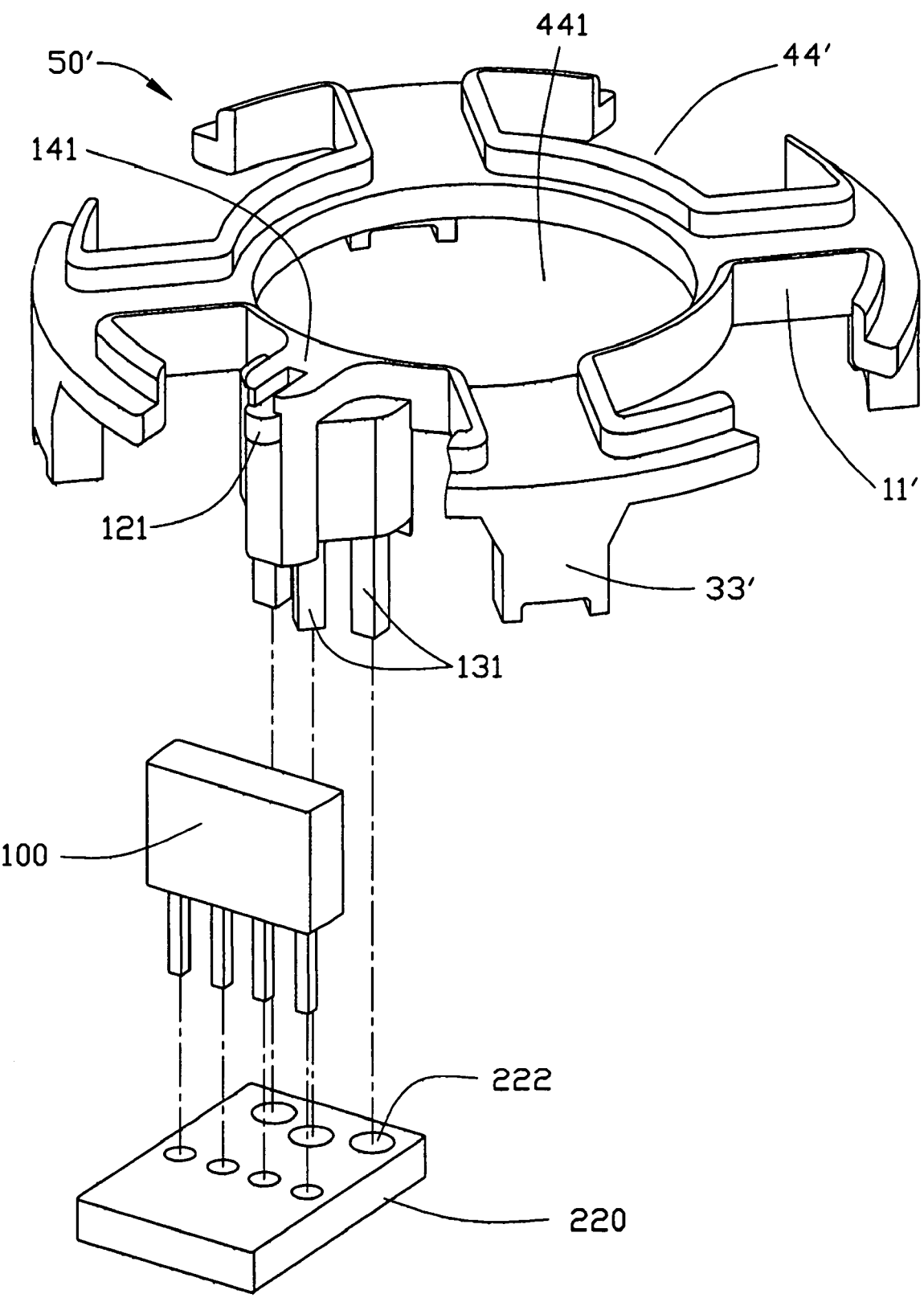
FIG. 5 is an exploded, isometric view of the fan motor in FIG. 4.
Figure 6:
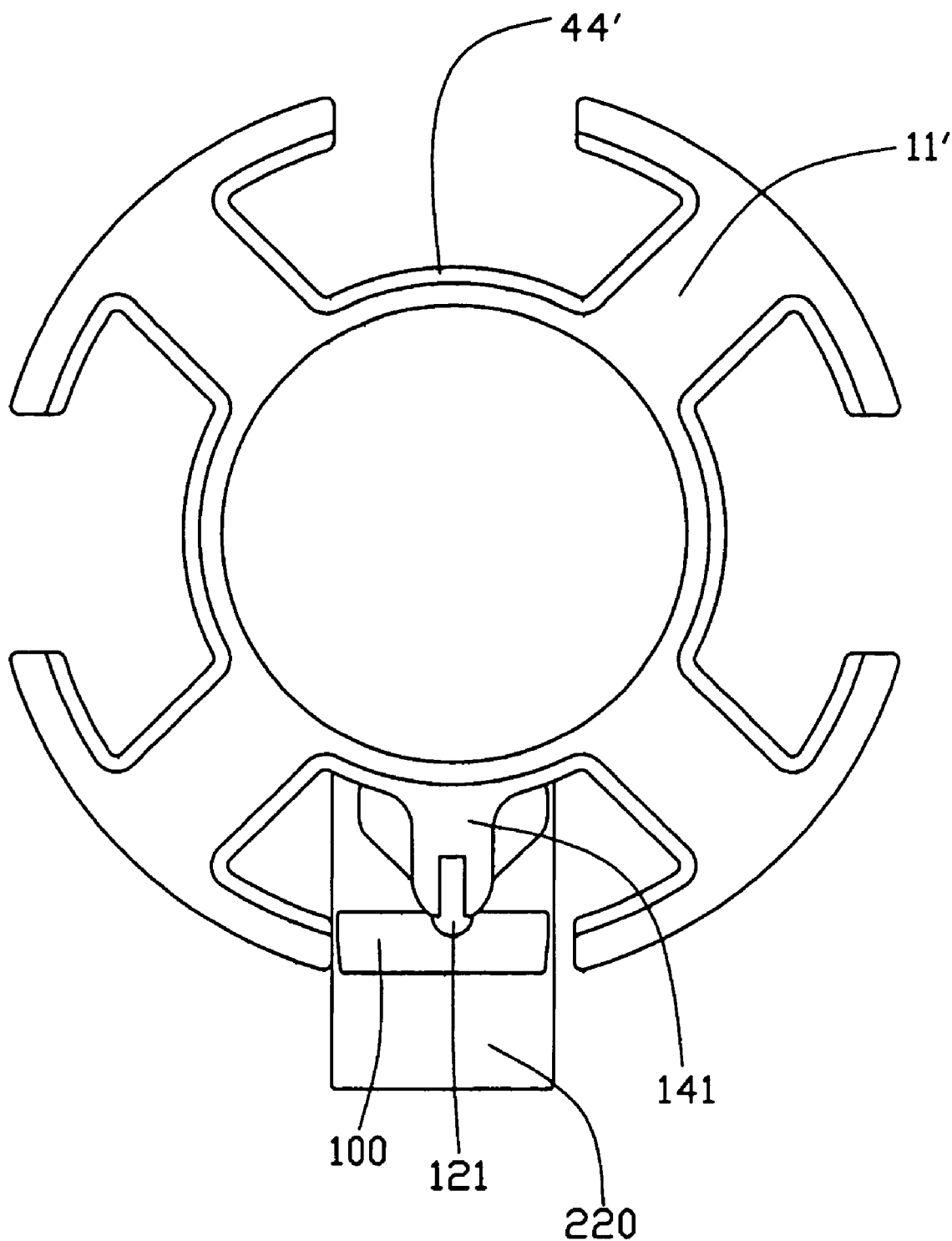
FIG. 6 is a top plan view of the fan motor in FIG. 4.
Figure 7:
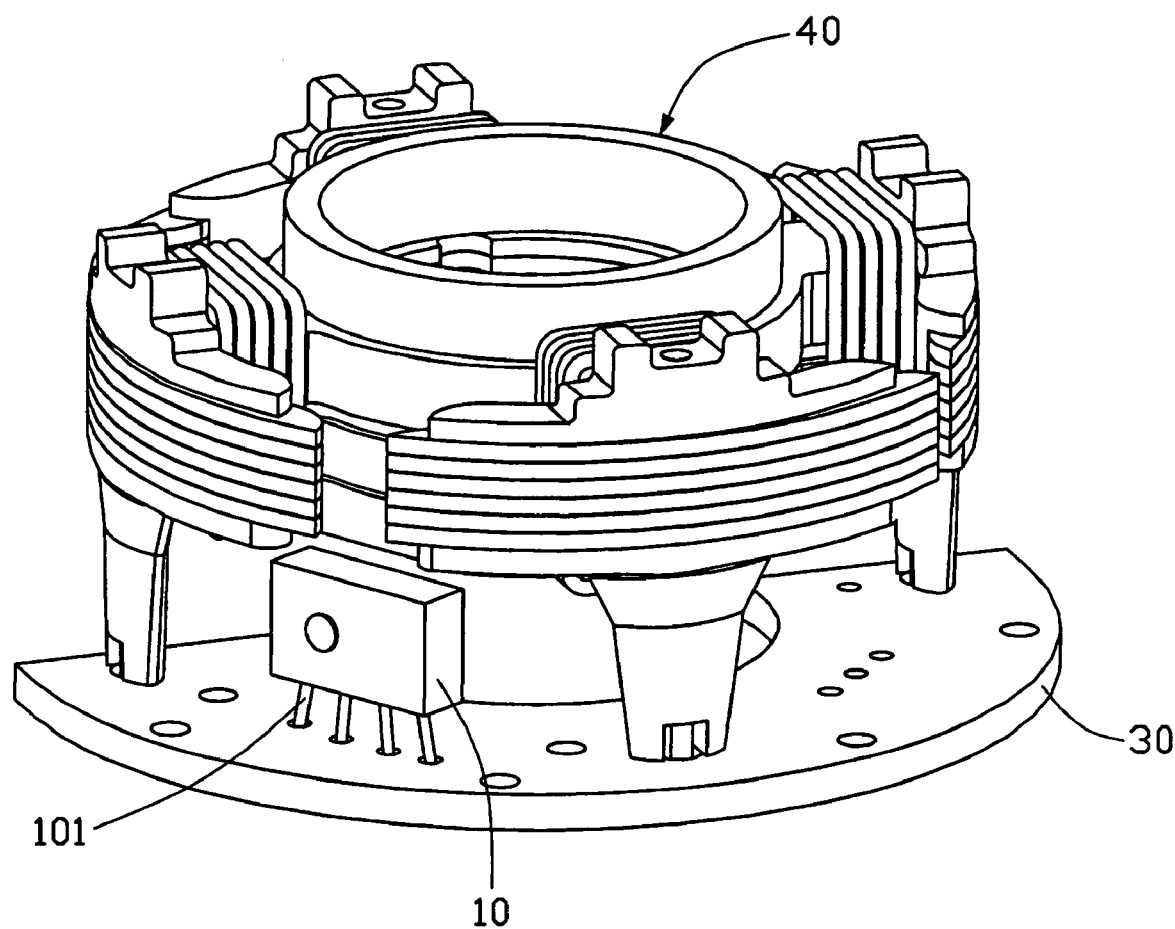
FIG. 7 is an assembled view of a conventional fan motor.

FIGS. 4-6 illustrate a fan motor according to an alternative embodiment of the present invention. Except for the insulating frame 50' and the printed circuit board 220, other parts of the fan motor have substantially the same configuration with the fan motor of the preferred embodiment.

Similar to the insulating frame 50, the insulating frame 50' has a main body 44' comprising a plurality of arms 11' and flanges 33'. An opening 441' is defined in the main body 44'. A retaining member 141 is formed on the main body 44' between two neighboring flanges 33'. The retaining member 141 comprises a flat front surface and a pressing portion 121 to engage with the IC 100 to prevent slant of the IC 100. The difference is that no first mounting pins extend from the flange 33'. Instead, three second mounting pins 131 extend downwardly from the bottom end of the retaining member 141. A plurality of holes 222 is defined in the printed circuit board 220 corresponding to the second mounting pins 131. The insulating frame 50' is mounted on the printed circuit board 220 by the second mounting pins 131 extending into the holes 222.

It is understood that the invention may be embodied in other forms without departing from the spirit thereof. The above-described examples and embodiments are to be considered in all respects as illustrative and not restrictive, and the invention is not to be limited to the details given above.

What is claimed is:

1. A fan motor comprising:
   a printed circuit board;
   an IC mounted on the printed circuit board; and
   an insulating frame mounted on the printed circuit board, the insulating frame comprising:
   a main body comprising a plurality of arms radially extending therefrom for windings wound therearound, and
   a retaining member extending radially and outwardly from the main body corresponding to the IC, the retaining member being located between two neighboring ones of the arms and comprising a pressing portion pressing the IC to prevent slant of the IC.

2. The fan motor as described in claim 1, wherein the pressing portion is formed on the retaining member at a top front thereof to engage a top surface of the IC.

3. The fan motor as described in claim 2, wherein the retaining member forms a flat front surface abutting a side surface of the IC.

4. The fan motor as described in claim 1, wherein a flange extends downwardly from an outer end of each of the arms, two of the flanges that are adjacent to the retaining member each form a first mounting pin, and the printed circuit board defines holes receiving the first mounting pins therein.

5. The fan motor as described in claim 4, wherein a second mounting pin is formed on a bottom end of the retaining member, and the printed circuit board defines a mounting hole receiving the second mounting pin therein.

6. The fan motor as described in claim 1, wherein a plurality of mounting pins extend from a bottom end of the retaining member, and the printed circuit board defines a plurality of mounting holes receiving the mounting pins therein.

7. A fan motor comprising:
   a printed circuit board defines a plurality of mounting holes therein;
   an IC mounted on the printed circuit board; and
   a stator assembly comprising an insulating frame having a main body with a plurality of mounting flanges extending toward the printed circuit board, and a retaining member engaging with the IC to prevent slant of the IC with respect to the printed circuit board, a plurality of mounting pins being formed on the stator assembly; wherein
   the retaining member forms at least one of the mounting pins engaging into the mounting holes to secure the insulating frame to the printed circuit board, and wherein the retaining member extends from the main body and is located between two neighboring ones of the mounting flanges.

8. The fan motor as described in claim 7, wherein the retaining member forms one mounting pin thereon, and the other mounting pins are formed on the two neighboring ones of the flanges.

9. The fan motor as described in claim 7, wherein the retaining member comprises a front surface to abut a side surface of the IC.

10. The fan motor as described in claim 9, wherein the retaining member further comprises a pressing portion formed at a top front side thereof to engage with a top surface of the IC, the top surface of the IC being perpendicular to the side surface.

11. The fan motor as described in claim 7, wherein all of the mounting pins are formed on the retaining member.

12. A fan motor comprising:
   an electronic component located in said fan motor, one side of said electronic component having an electrical connection; and
   a frame located in said fan motor next to said electronic component, and having at least one portion protruding radially and outwardly from said frame and reachable to another side of the electronic component other than said one side having said electrical connection so as to retain said electronic component in a predetermined position of said fan motor;
   wherein said electronic component is mounted on a printed circuit board to establish said electrical connection and said printed circuit board is engagable with said frame; and
   wherein said at least one portion of said frame forms a plurality of mounting pins, and the printed circuit board defines a plurality of mounting holes receiving the mounting pins therein to secure the frame thereon.

13. The fan motor as described in claim 12, wherein said at least one portion of said frame is a pressing portion abutting against said another side of said electronic component opposing to said one side.

* * * * *